United States Patent [19]

Fukami

[11] Patent Number: 5,430,741
[45] Date of Patent: Jul. 4, 1995

[54] REPEATED DECODING OF PRODUCT CODE DURING SUCCESSIVE TAPE HEAD ROTATION PERIODS

[75] Inventor: Tadashi Fukami, Kanagawa, Japan

[73] Assignee: Sony Corporation, Tokyo, Japan

[21] Appl. No.: 96,362

[22] Filed: Jul. 22, 1993

Related U.S. Application Data

[63] Continuation of Ser. No. 556,446, Jul. 24, 1990, abandoned.

[30] Foreign Application Priority Data

Jul. 29, 1989 [JP] Japan ................. 1-197827

[51] Int. Cl.$^6$ .............................................. G11B 20/18
[52] U.S. Cl. ................................................... 371/37.4
[58] Field of Search ............................ 371/37.4, 37.5

[56] References Cited

U.S. PATENT DOCUMENTS

| | | | |
|---|---|---|---|
| 4,646,301 | 2/1987 | Okamoto et al. | 321/37.4 |
| 4,748,628 | 5/1988 | Moriwaki | 371/37.7 |
| 4,796,261 | 1/1989 | Moriwaki | 371/37.4 |
| 4,812,924 | 3/1989 | Fukami et al. | 360/32 |

FOREIGN PATENT DOCUMENTS

| | | |
|---|---|---|
| 0105499 | 4/1984 | European Pat. Off. |
| 0140381 | 5/1985 | European Pat. Off. |
| 0232133 | 8/1987 | European Pat. Off. |
| WO8809966 | 12/1988 | WIPO |

OTHER PUBLICATIONS

D. Shenton et al., *Improved Reed–Solomon Decoding Using Multiple-Pass Decoding*, Journal of the Audio Engineering Society, vol. 33, No. 11, Nov. 1985, pp. 878–887.

*Primary Examiner*—Stephen M. Baker
*Attorney, Agent, or Firm*—Jay H. Maioli

[57] ABSTRACT

A decoding apparatus in which for plural symbols arranged in a matrix fashion first and second error correction codes are encoded for each of the plural symbols respectively arranged in a first direction and in a second direction and in which input data is transmitted in the first direction. The decoding apparatus includes a first memory for writing input data, an error detector for detecting an error of the input data that is written into the first memory based on the first error correcting code and for generating error data from the first error correction code. A second memory is provided for writing error data of the first error correction code and an error corrector is provided for sequentially executing error corrections of the first and second error correction codes for the input data that is written into the first memory by using the error data of the first error correction code that is written into the second memory.

5 Claims, 8 Drawing Sheets

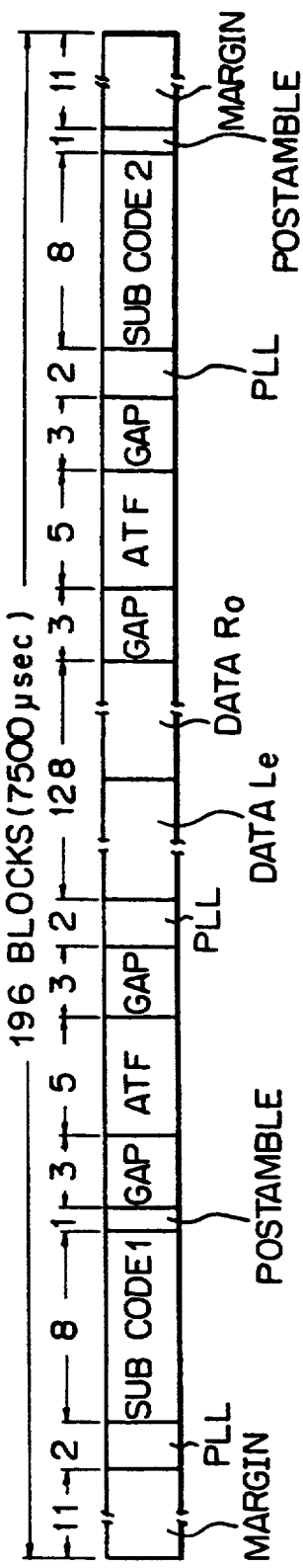
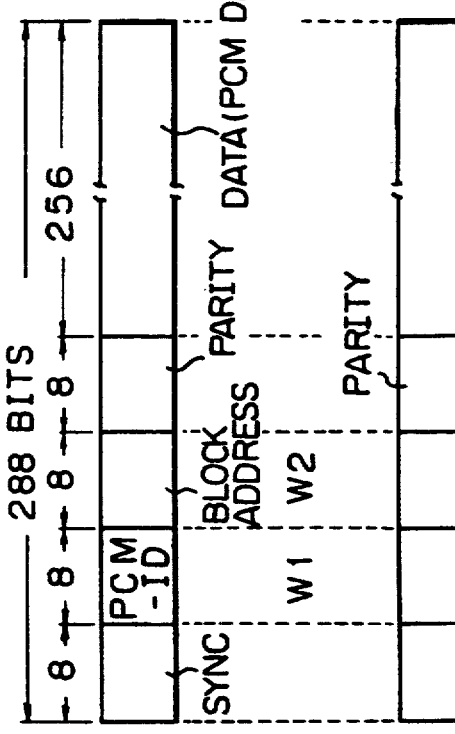
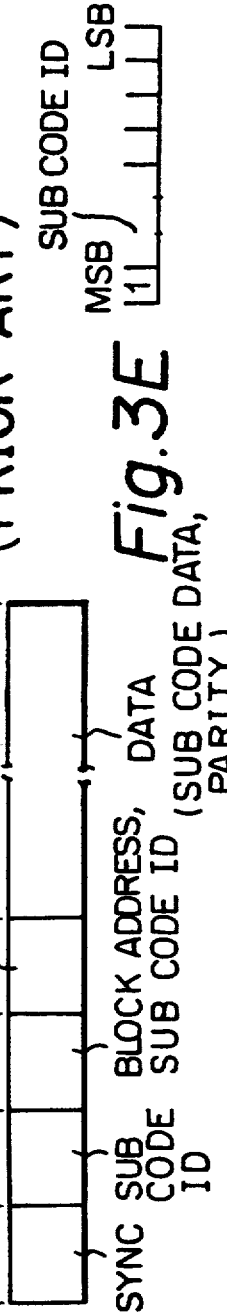

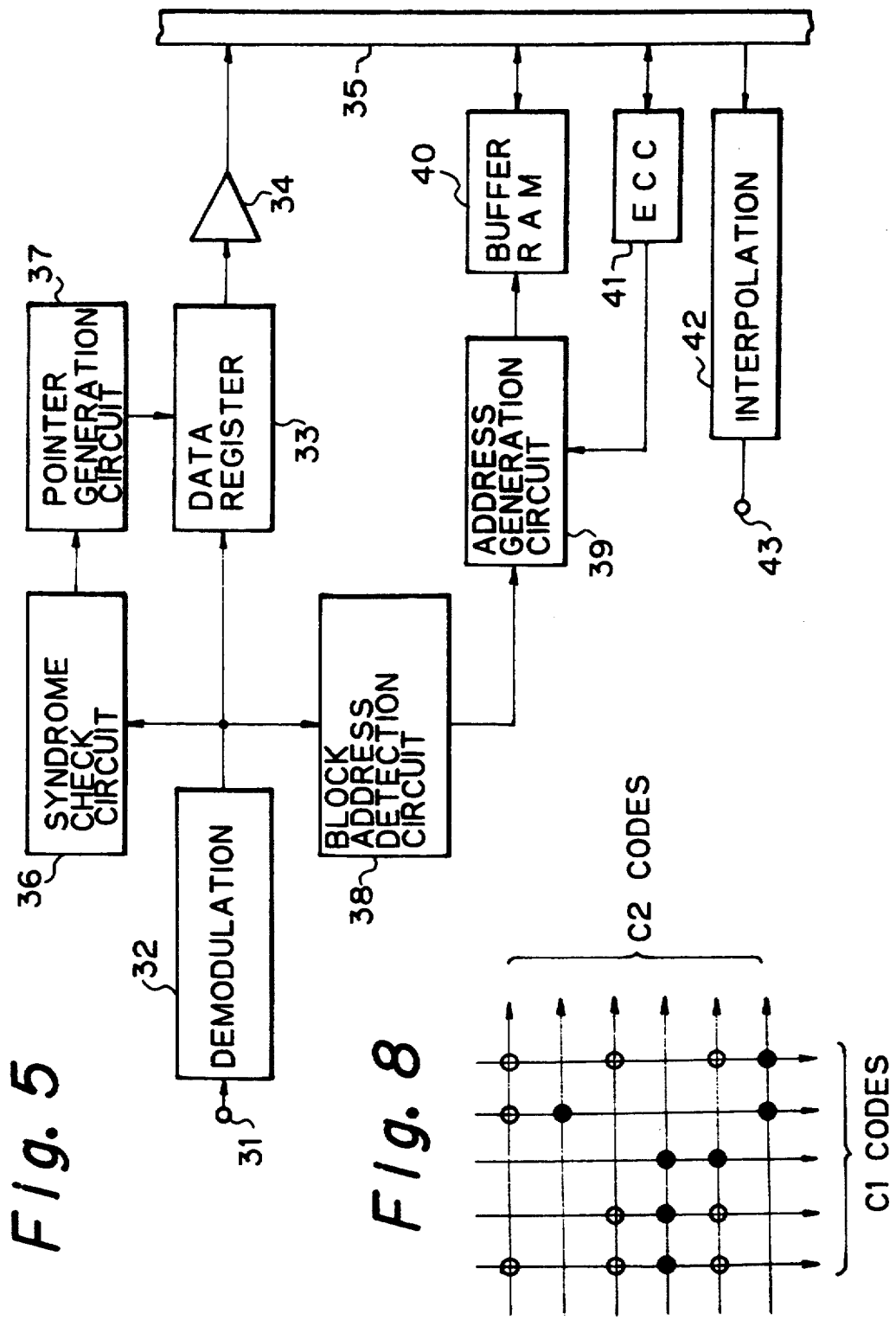

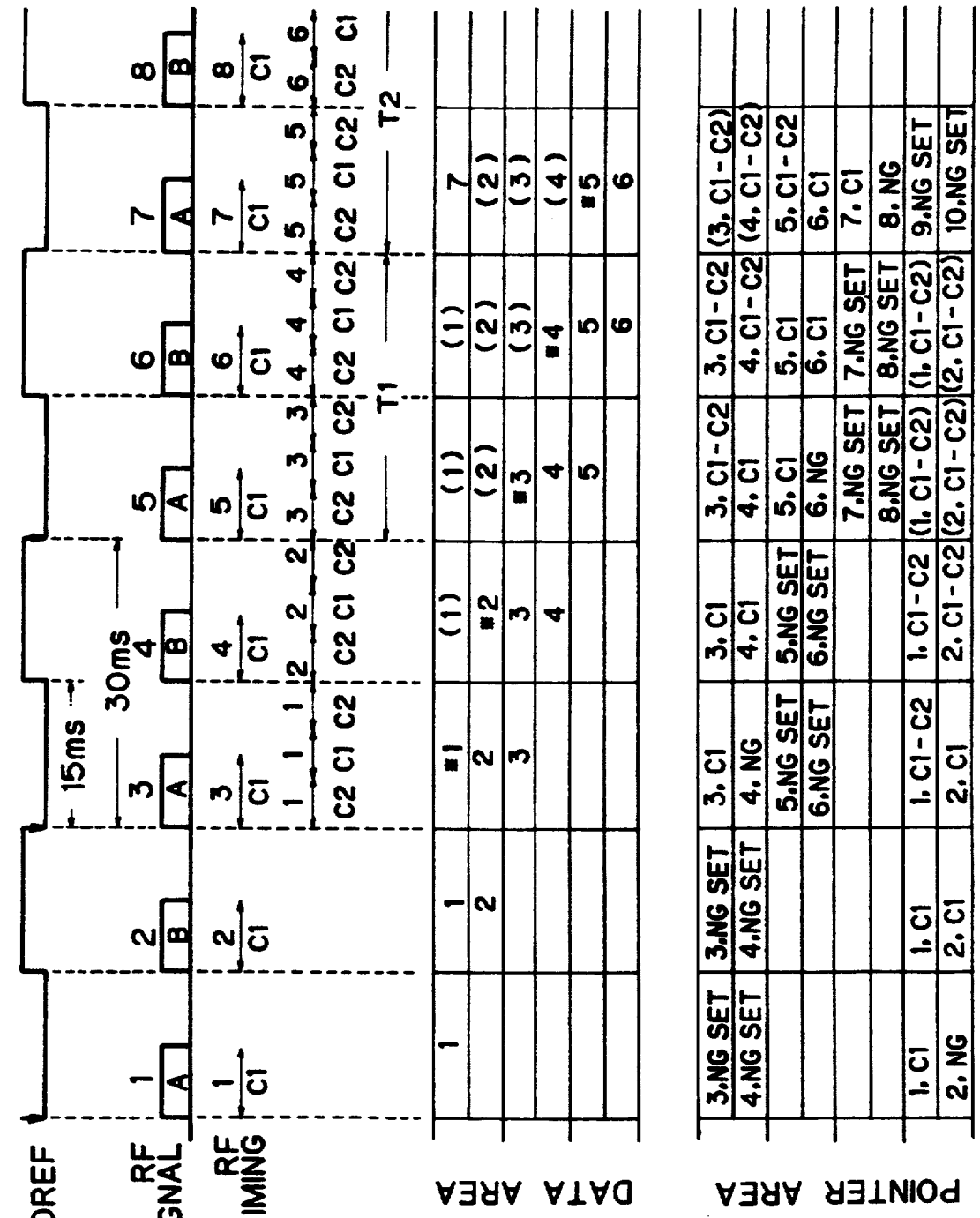

REPEATED DECODING OF PRODUCT CODE DURING SUCCESSIVE TAPE HEAD ROTATION PERIODS

This is a continuation of application Ser. No. 07/556,446, filed Jul. 24, 1990, now abandoned.

BACKGROUND OF THE DISCLOSURE

1. Field of the Invention

The present invention relates generally to a decoding apparatus and, more particularly, to a decoder for use with digital signal reproducing equipment used for reproducing a digital information signal, such as a digital audio signal, a digital video signal, or the like.

2. Description of the Background

As an error correction code in the case of recording/reproducing a digital audio signal, such as a PCM signal, by a pair of rotary heads there is frequently used a so-called block completion type product code in which the PCM signals to be recorded/reproduced by one rotary head are arranged in a matrix form. In the block completion code the coding of a first error correction code, referred to as C1 code, is performed for the PCM signals arranged in the vertical or column direction of this matrix arrangement. The coding of a second error correction code, referred to as C2 code, is executed for the PCM signals arranged in the lateral or row direction of the matrix arrangement. The PCM signals that have been subjected to the coding of those two error correction codes and the vertically arranged check symbols of the respective error correction codes C1 and C2 are then recorded.

On the reproduction side, the C1 decoding of the error correction code C1 is performed after the writing of reproduced data into a buffer memory, and the C2 decoding of the error correction code C2 is then executed.

In a product code, the error correction capability increases with increased numbers of the C1 decoding and C2 decoding. Despite the fact that the correction capability for random error is improved with the increased number of decodings, the C1 decoding and the C2 decoding are usually performed only once. This is because the time available for decoding is limited. It has been proposed that the time used for decoding be lengthened by improving the processing speed by using an increased operational clock frequency in the processor for decoding. Nevertheless, there are the problems of access time for a buffer memory and of increased power consumption. For this reason, simply raising the operational clock frequency of the processor is not a desirable or workable solution.

OBJECTS AND SUMMARY OF THE INVENTION

It is, therefore, an object of this invention to provide a decoding apparatus with improved error correction capability that can increase the number of times of decoding for a block completion type product code, even if the processing speed of the error correction processor is not particularly raised.

According to an aspect of the invention, there is provided a decoding apparatus in which for plural symbols arranged in a matrix fashion, first and second error correction codes are encoded for each of the plural symbols respectively arranged in a first direction and a second direction and input data transmitted in the first direction is supplied. The apparatus includes a first memory for writing input data, an error detector for detecting errors in the input data that is written into the first memory based on the first error correction code and for generating error data from the first error correction code. A second memory is provided for writing error data of the first error correction code and an error corrector is provided for sequentially executing error corrections of the first and second error correction codes on the input data that is written into the first memory by using the error data of the first error correction code, which is written into the second memory.

The above and other objects, features, and advantages of the present invention will become readily apparent from the following detailed description thereof, which is to be read in connection with the accompanying drawings, in which like reference numerals represent the same or similar elements.

BRIEF DESCRIPTION OF THE DRAWINGS

FIGS. 3A-3E are representations useful in explaining a track format and a block format of the digital tape recorder;

FIG. 5 is a block diagram of a reproduction signal processor;

FIGS. 6A-6F are timing charts useful in explaining the decoding operation;

FIGS. 7 and 7A-7C are flow charts useful in explaining the decoding operation; and FIG. 8 is a representation useful in describing the error correction operation of a product code.

DETAILED DESCRIPTION OF THE PREFERRED EMBODIMENT

Figure 1:
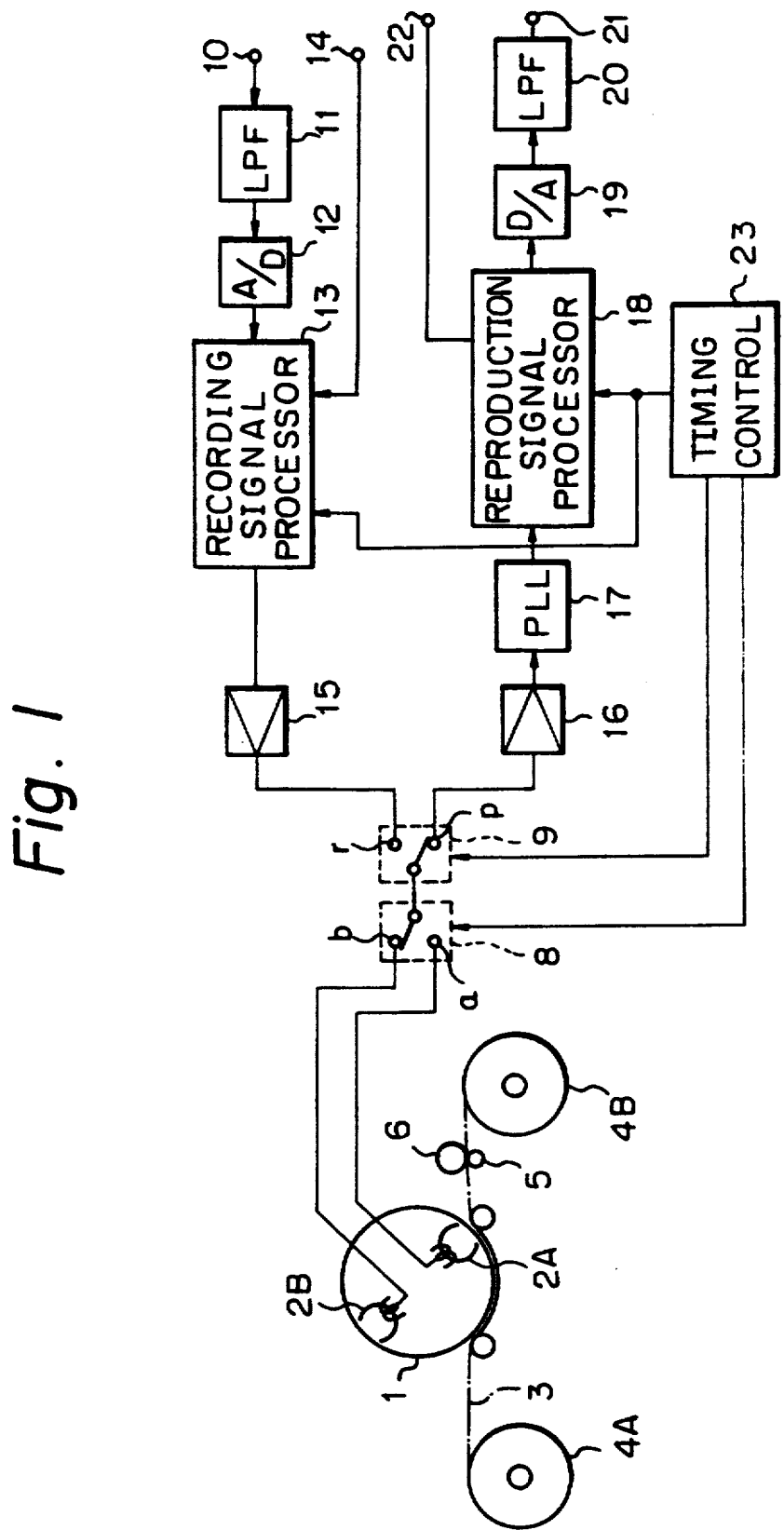
FIG. 1 is a block diagram showing the complete structure of a rotary head type digital tape recorder (R-DATA) to which an embodiment of the present invention can be applied.

FIG. 1 shows the overall structure of a rotary head type digital tape recorder, which is the so-called R-DAT. A drum 1 has a diameter of 30 mm and rotates at 2000 rpm and a pair of magnetic heads 2A and 2B are attached to drum 1 and are separated by an angular interval of 180°. A magnetic tape 3 is obliquely wound around drum 1 with a wrap angle of 90° and magnetic tape 3 extends between reel hubs 4A and 4B of a tape cassette and is moved at a speed of 8.15 (mm/sec) in the standard mode by a capstan 5 and a pinch roller 6 according to the well-known operation.

Figure 2:
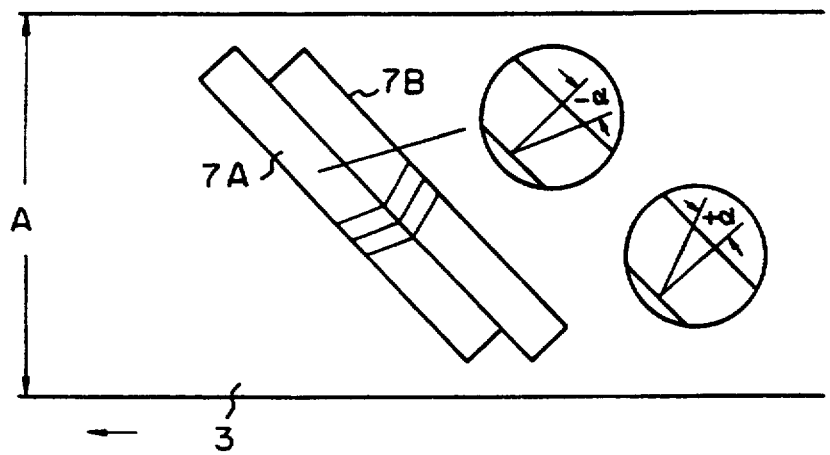
FIG. 2 is a schematic representation of a tape format of the digital tape recorder.

Magnetic heads 2A and 2B alternately come into contact with magnetic tape 3, so that oblique tracks 7A and 7B are formed on the magnetic tape 3, as shown in FIG. 2. The tape width A of the magnetic tape 3 is typically 3.81 mm, and the magnetic gap of one rotary head 2A is inclined by an angle $+\alpha$ with respect to the direction perpendicular to the track. The magnetic gap of the other rotary head 2B is inclined by the angle $-\alpha$ with respect to the direction perpendicular to the track. The angles of the magnetic gaps of the magnetic heads 2A and 2B are referred to as the $+$azimuth and $-$azimuth, respectively, and in this embodiment $\alpha = 20°$.

The magnetic heads 2A and 2B are alternately selected by a head change-over switch 8. A recording signal from a terminal r of a recording/reproducing switch 9 is supplied to magnetic heads 2A and 2B through rotary transformers (not shown). The signals reproduced by magnetic heads 2A and 2B are taken out at a terminal p of the recording/reproducing switch 9 through the rotary transformers.

An analog input audio signal fed in at an input terminal 10 is supplied to an A/D converter 12 through a low-pass filter 11 and converted into a digital audio signal. In the standard mode, the sampling frequency is selected as 48 kHz and 16-bit linear digitization is employed. The digital audio signal from the A/D converter 12 is supplied to a recording signal processor 13, where the error correction coding process of the digital audio signal and conversion into the recording data format are performed. In this case, an ID signal (PCM-ID) to identify the on/off state of the preemphasis of the signal to be recorded, the sampling frequency, the number of digitization bits, and the like is added. In addition, the subcodes such as program number, time code, and the like of the signal to be recorded and the ID signal for the subcodes are formed by a subcode encoder (not shown) and are supplied to recording signal processor 13 from a terminal 14.

The serial recording data for every track is generated from recording signal processor 13 synchronously with the rotation of magnetic heads 2A and 2B. The recording data is supplied to head change-over switch 8 through a recording amplifier 15 and terminal r of recording/reproducing switch 9. The recording data is alternately supplied to magnetic heads 2A and 2B by head change-over switch 8.

During playback the signals reproduced by the magnetic heads 2A and 2B are supplied to a reproducing amplifier 16 through head change-over switch 8 and terminal p of recording/reproducing switch 9. The output signal of the reproducing amplifier 16 is supplied to a PLL 17, where the clocks synchronized with the reproduction signal are extracted. The reproduction signal is subjected to processing for error correction, interpolation, and the like in a reproduction signal processor 18. The reproduced, processed digital audio signal is supplied to a D/A converter 19. The analog audio signal output from D/A converter 19 is fed to an output terminal 21 through a low-pass filter 20. The subcodes and subcode ID are separated in reproduction signal processor 18 and are fed out at an output terminal 22. A subcode decoder (not shown) is connected to the output terminal 22, and the control data and the like are formed from the subcodes.

Suitable control signals to control head change-over switch 8 and recording/reproducing change-over switch 9 are produced by a timing controller 23. Timing controller 23 also generates clock signals and timing signals that are used in recording signal processor 13 and in reproduction signal processor 18.

The portion of data that is recorded in one track is called one segment. FIG. 3A shows an arrangement of the data of one segment that is recorded by one rotary head. Assuming that a unit amount of the recording data is one block, 196 blocks (7500 μs) of data are included in one segment. Eleven block margins are provided in both ends of one segment, which correspond to the ends of a track. Subcodes 1 and 2 are recorded adjacent the margins, and these two subcodes are the same data recorded twice. Generally, the subcode includes the program number and the time code. A run-in interval of two blocks of the PLL and a postamble interval of one block are arranged on both sides of the recording area of eight blocks of the subcode. To improve the ability to discriminate data inter-block gaps of three blocks, in which no data is recorded, are provided at the beginning and end of data blocks. A five-block pilot signal for automatic track finding (ATF) is recorded between two inter-block gaps of three blocks each. The PCM signal that has been subjected to the recording processing is recorded in an area of 128 blocks that is preceded by a run-in interval for the PLL of two blocks. The PCM signal is derived from the data corresponding to the audio signal for a period of time equal to 15 ms when the rotary head rotates one-half of a full rotation.

The PCM signal comprises stereophonic PCM data for two channels consisting of the left (L) and right (R) channels and the parity data of the error detection/correction codes. When one segment as shown in FIG. 3A is recorded/reproduced by magnetic heads 2A, data Le is recorded in the left-half portion of the 128 block PCM signal recording area and data Ro is recorded in the right-half portion. The data Le consists of the even number designated data of the L channel and the parity data concerned with that data. The data Ro consists of the odd number designated data of the R channel and the parity data concerned with this data. The odd numbers and even numbers are based on the order when counted from the beginning of the interleave blocks.

One segment of data having the same constitution as that of the foregoing track is recorded in the next track that is formed by the other magnetic head. In that next track data Re is recorded in the left-half portion of the data interval in the one segment of data in the other track, and data Lo is recorded in the right-half portion. The data Re consists of the even number designed data of the R channel and the parity data concerned with that data. The data Lo consists of the odd number designed data of the L channel and the parity data with respect to this data. The reason why the even number designated data and the odd number designed data of each channel are separately recorded in two adjacent tracks and the data of the L and R channels is recorded in the same track is to prevent the continuous data of the same channel from becoming erroneous due to dropouts and the like.

FIG. 3B shows a data construction of one block of the PCM signal. A block sync signal of eight bits, in which eight bits equals one symbol, is added to the beginning of one block and the PCM-ID of eight bits is then added. The block address is added after the PCM-ID. The error correction coding processing of the simple parity kind is performed with respect to two symbols, W1 and W2, comprising the PCM-ID and block address, respectively. The eight-bit parity code is then added after the block address. As shown in FIG. 3D, the block address is constituted by seven bits excluding the most significant bit (MSB). The most significant bit is set to "0" to indicate that the block is the PCM data block.

The seven bit block address sequentially changes from (00) to (7F) in hexadecimal notation. The PCM-ID that is recorded in each block having a block address whose lower three bits are (000) (010) (100) (110) is determined. An optional code of the PCM-ID can be recorded in each block having a block address whose lower three bits are (001) (011) (101) (111). Subcodes ID1 to ID8 each consisting of two bits and the frame address of four bits are included in the PCM-ID. The identification information is defined for each of the ID1 to ID7 subcodes. One block includes thirty-two ID8 subcodes. For example, the ID1 subcode is the format ID indicating the kind of application, whether audio or otherwise, for the data. The on/off state of the preemphasis and the characteristics of the preemphasis are identified by subcode ID2. The sampling frequency is identified by subcode ID3. The foregoing subcodes ID1 to ID7 and the frame address have the same data in the segment of the interleave pair.

FIG. 3C shows a data structure of one block of the subcodes. The data constitution is similar to that of the foregoing PCM block. As shown in FIG. 3E, the most significant bit of the symbol W2 of the subcode block is set to "1" thereby indicating that the block is the subcode block. The lower four bits of the symbol W2 are used as the block address. Eight bits of the symbol W1 and three bits in the symbol W2, except the MSB and the block address in symbol W2, are used as the subcode ID. The error correction coding using simple parity is executed with regard to the two symbols, W1 and W2, of the subcode block and the parity code of eight bits is added after the block address subcode ID.

The data of the subcode ID that is recorded in the even number designated block addresses has the least significant bit of the block address set at "0" which differs from the data of subcode ID that is recorded in the odd number designated block address, wherein the least significant bit of the block address is set at "1". The subcode ID includes the control ID used to designate the producing method, the time code, and the like. The subcode data is subjected to error correction coding processing using a Reed-Solomon code similar to the PCM data.

Figure 4A:
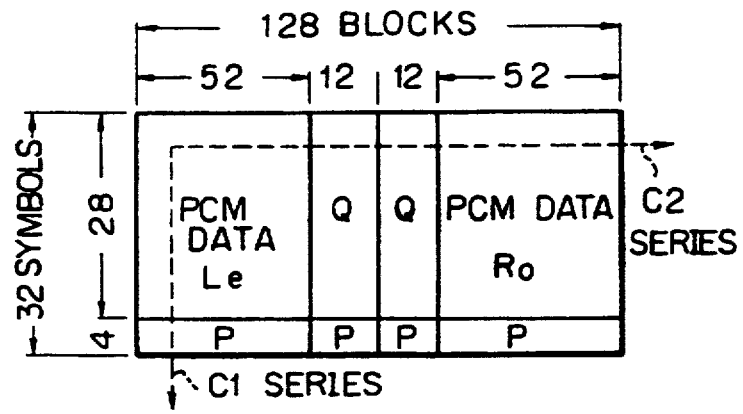
FIG. 4 is a representation useful in explaining error correction codes of the digital tape recorder.
Figure 4B:
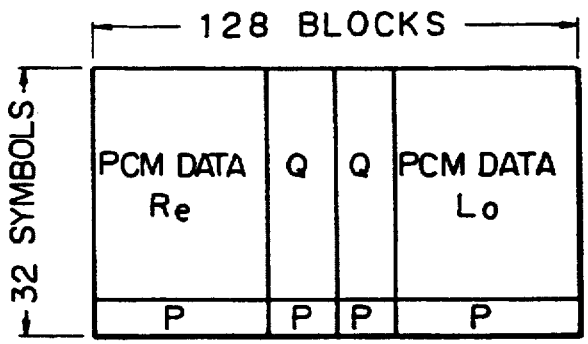

The processes of the error detection/correction codes are executed every 128 blocks of the data that is recorded in one segment. FIG. 4A shows a code construction of one segment of the data that is recorded by one magnetic head 2A, and FIG. 4B shows the code construction for one segment of the data that is recorded by the other magnetic head 2B. The PCM signal having sixteen digitization bits is divided into upper eight bits and lower eight bits and subjected to processing of the error detection/correction codes in which eight bits are used as one symbol.

Data of 4096 symbols (128×32=4096) is recorded in one segment and, as shown in FIG. 4A, the coding processes of an error detection code C1 and an error correction code C2 are executed with respect to each of the vertical and horizontal directions of the two-dimensional arrangement of the data comprising the even number designated data Le of the L channel consisting of the symbols (L0, L2, . . . , L1438) and the odd number designated data Ro of the R channel consisting of the symbols (R1, R3, . . . , R1439). The twenty-eight symbols in the vertical direction are subjected to the coding process of the C1 code using the (32, 28, 5) Reed-Solomon code. Parity data P of four symbols of the C1 code is arranged at the last position of the two-dimensional arrangement. On the other hand, the fifty-two symbols in the horizontal direction are subjected to the coding process of the C2 code using the (32, 26, 7) Reed-Solomon code. The coding of the C2 code is secured with respect to twenty-six pairs of every two symbols among the fifty-two symbols. Parity data Q consisting of six symbols is generated with respect to one code series. The parity data Q consisting of a total of twelve symbols of the C2 code is arranged in the central portion of the two-dimensional code arrangement. A coding process similar to the C2 code is performed with regard to the other fifty-two symbols of the PCM data arranged in the horizontal direction. Parity data Q is arranged in the central portion of the two-dimensional arrangement. Each error correction of the C1 code and the C2 code is made with respect to the series of 128 symbols.

The code construction shown in FIG. 4B is obtained by replacing the even number designated PCM signals of the L channel in the code construction of FIG. 4A by even number designated PCM signals (R0, R2, . . . , R1438) of the R channel and by replacing the odd number designated PCM signals of the R channel by the odd number designated signals PCM signals (L1, L3, . . . , L1439) of the L channel.

A complete PCM block is formed by adding the sync signal, PCM-ID, block address, and parity to the vertically arranged thirty-two symbols, as shown in FIG. 3B.

This invention relates to error correction of the reproduced data in the reproduction signal processor of the above-described rotary-head, digital audio tape recorder and FIG. 5 shows one embodiment of such a reproduction signal processor. The reproduced signal is fed in at an input terminal 31 to a demodulator 32 and each ten-bit symbol is demodulated into an eight-bit symbol. When the data was recorded on the magnetic tape, eight bits making one symbol were subjected to digital modulation to convert it into a desirable pattern of ten bits in order to reduce the low-frequency component as much as possible. The reproduced demodulated data from demodulator 32 is supplied to a data bus 35 through a data register 33 and a buffer 34.

The data from demodulator 32 is also fed to a C1 syndrome check circuit 36, and error detection is performed by the C1 code. The C1 syndrome check circuit 36 has a simplified circuit structure for calculating a syndrome for every series of C1 codes and for checking whether there is an error from the syndrome without executing error correction. The result of this check indicative of the presence of absence of an error of the C1 syndrome check circuit 36 is supplied to a pointer generation circuit 37. Pointer generation circuit 37 generates a C1 pointer indicating the presence of absence of an error for every series of 128 C1 codes. The C1 pointer is fed to data bus 35 also through data register 33 and buffer 34. Since the direction of the C1 code series coincides with the direction of the data arrangement with which the data was recorded/reproduced, the error detection operation by the C1 syndrome check circuit 36 is performed in parallel with, and simultaneously with, the writing of the reproduced data into a buffer RAM 40.

Buffer RAM 40 and an error correction circuit 41 are also connected to data bus 35, and the reproduced data is stored in buffer RAM 40 and is subjected to error correcting processing using a Reed-Solomon code in error correction circuit 41. Buffer RAM 40 has memory areas specifically allotted for the reproduced data and the pointer. The error corrected PCM signal and the pointer are also supplied to an interpolating circuit 42, wherein uncorrectable errors are interpolated. Then, the reproduced error corrected PCM signal is fed out at an output terminal 43 and supplied to D/A converter 19 of FIG. 1. Also, the subcodes are subjected to processing such as error correction and the like by a subcode decoder (not shown) and made available at the output terminal for the subcodes. Interpolating circuit 42 performs average-value interpolation, the holding of a previous value, or some other kind of interpolation with respect to PCM signal words specified by the pointer among the PCM signals subjected to the error correction processing.

In addition, a block address detection circuit 38 receives the output of demodulator 32 and operates to detect the reproduction block address. The detected reproduction block address is then supplied to an address generation circuit 39 that generates a reproduction address used as an address signal for buffer RAM 40. The reproduction address used to write the reproduction data of one segment (32 symbols × 128 blocks) in accordance with the order from the first block to the 128th block.

An address for error correction circuit (ECC) 41 is also generated by address generation circuit 39, and the address for ECC 41 is also supplied to buffer RAM 40. The address for ECC 41 is used to read out the data from buffer RAM 40 for the respective C1 and C2 decoding and to write the error corrected data and a pointer into buffer RAM 40.

In this reproduction signal processor, a frame address detector for detecting a frame address from PCM-ID in the reproduced data, a frame address decision circuit for deciding whether the detected frame address is correct, an interpolation control circuit for controlling the interpolating circuit and the like are also provided but are not shown in the interest of clarity and brevity.

The C1 pointer is developed by C1 syndrome check circuit 36 and pointer generation circuit 37 in parallel with the writing of the demodulated data into buffer RAM 40. This development of the C1 pointer is done as the first C1 decoding, the first C2 decoding is then performed, the second C1 decoding is carried out, and the second C2 decoding can be further performed by error correction circuit 41.

FIG. 6 is a timing chart of the decoding operation according to one embodiment of the present invention and shows a reference pulse DREF in synchronism with the rotation of rotary heads 2A and 2B. Because the rate of revolution of rotary heads 2A and 2B is 2000 rpm, the period of the reference pulse DREF is 30 ms, and the rotary head 2A reproduces data from the magnetic tape 3 during a 15 ms period having a low level, while the rotary head 2B reproduces data from the magnetic tape 3 during a 15 ms period having a high level. Consequently, an RF signal shown in FIG. 6B is produced and A represents the output of rotary head 2A and B represents the output of rotary head 2B. In FIG. 6B, each of the RF signals is numbered successively corresponding to the reproduced signals from the respective tracks. As described above, the first C1 decoding is performed in synchronism with the timing of the RF signal, as represented in FIG. 6C.

A change of the contents of the data area of buffer RAM 40 is indicated in FIG. 6E, and a change of the contents of the pointer area is indicated in FIG. 6F. To store reproduced data having a period of 15 ms, a 32 K-bit memory capacity is needed, and for this data area a memory capacity of 192 K-bits (3×6=192) is prepared. A memory capacity of 64 K-bits (8×8=64) is prepared for the pointer area and buffer for the subcode.

The reproduced, demodulated data is written into the data area of buffer RAM 40 sequentially, such that the reproduced data from track 1 to track 6 is written into each 32K-bit area sequentially, and the reproduced data of track 7 is written into the same area as the reproduced data of track 1. For example, looking at the processing of the reproduced data of track 3, the C1 decoding is carried out at the timing when the reproduced data is provided. A not-updated pointer (NG) is set beforehand in a previous rotation period in the pointer area where the C1 pointer of track 3 is written, as shown in FIG. 6F. The C1 pointer generated by the first C1 decoding is written into the pointer area at the timing when the reproduced data is written into the data area.

In the rotation period in which the reproduced RF signals of next successive tracks 5 and 6 are provided, as shown in FIG. 6D, the C2 decoding, the second C1 decoding, and the second C2 decoding are carried out with respect to the reproduced data of track 3. This decoding process is performed by error correction circuit 41 and at the completion of the decoding the decoded data, which is shown by, in FIG. 6E, has all been stored in the data area of buffer RAM 40. Meanwhile, the C1 pointer and C2 pointer developed by the above-mentioned decoding process are stored in the pointer area of buffer RAM 40.

In this example, since an interleave format that is completed with two tracks is applied, after the decoding of tracks 3 and 4 data is output for a period indicated at T2, following the decoding of the reproduced data of track 3 and following the decoding of the reproduced data of the track 4. T1 is a period in which data is output after the decoding of tracks 1 and 2. In this case, the data is output with the points (3, C1-C2) and (4, C1-C2) of the pointer area. The time allowed for the first C2 decoding, the second C1 decoding, and the second C2 decoding is 15 ms. The first C1 decoding is performed with the timing of the RF signal, and the decoding of the remaining three stages is done in the rotation period after the writing of data into the data area of buffer RAM 40. For this reason, it is possible to complete the decoding process within this time without increasing the processing speed, which processing speed increase is typically required by the prior art. Because the decoding of the RF signal is performed in the period of 15 ms in which the RF signal is obtained, each of the C1 decoding and C2 decoding can be done only once, conventionally.

Figure 7A:
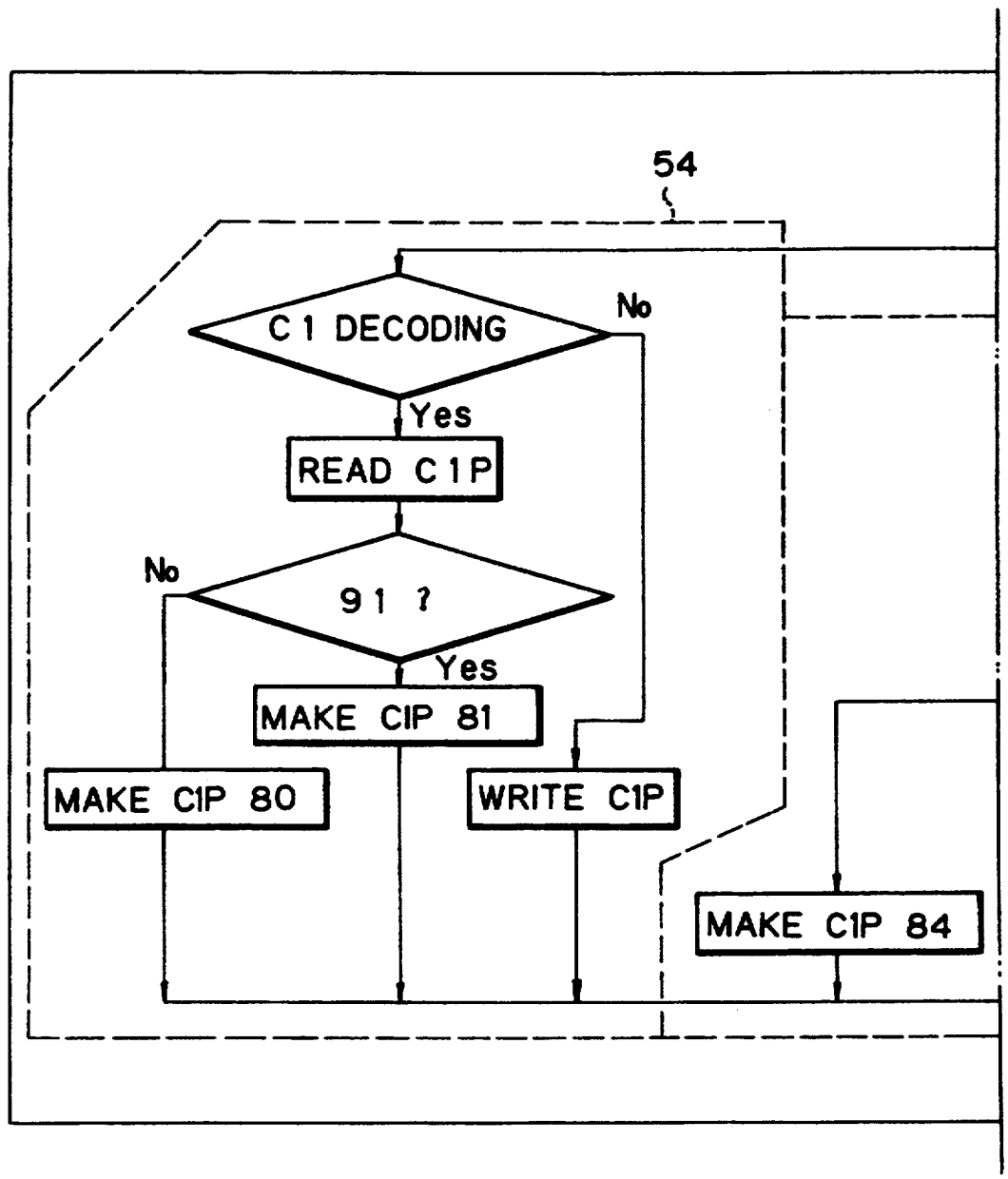
Figure 7B:
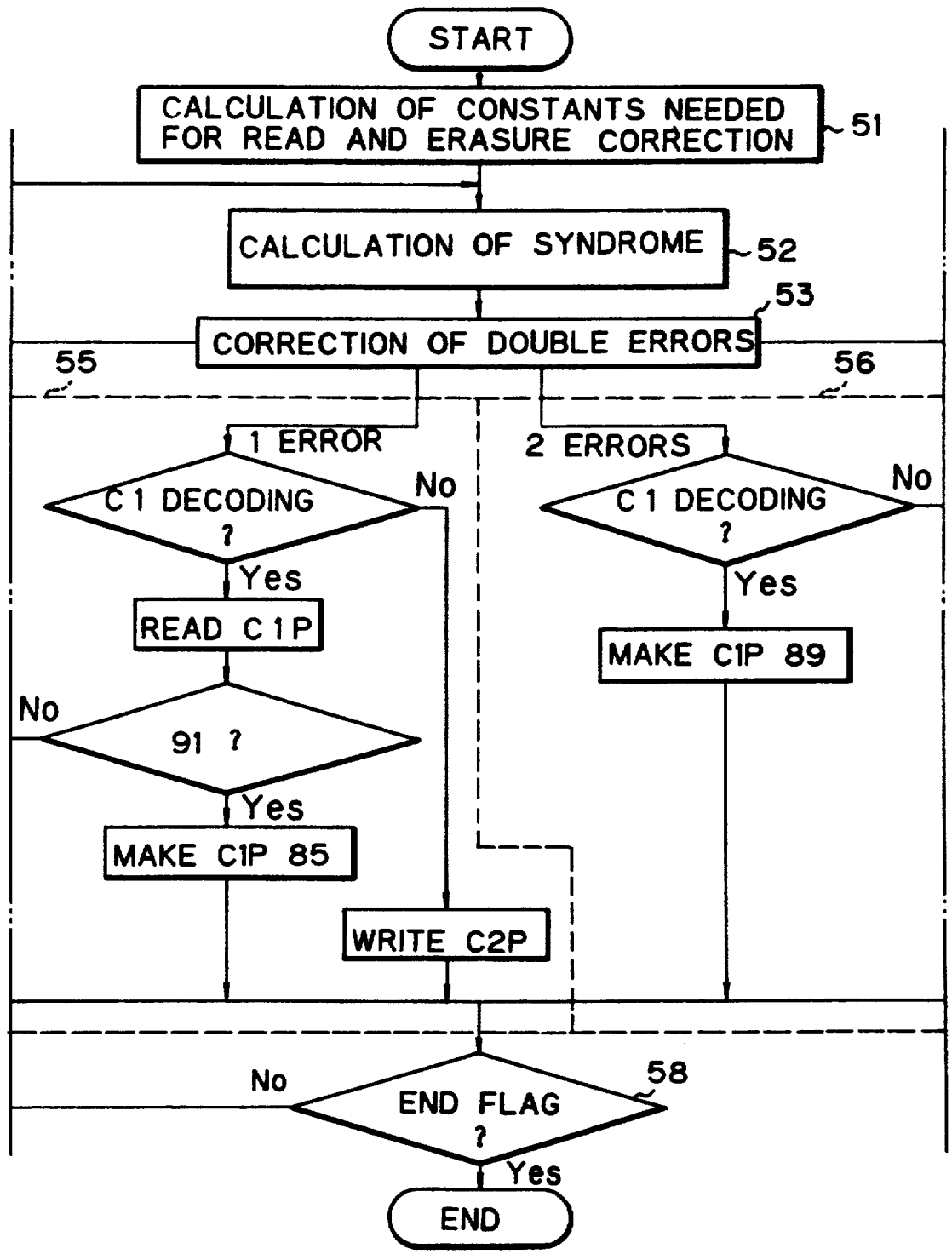
Figure 7C:
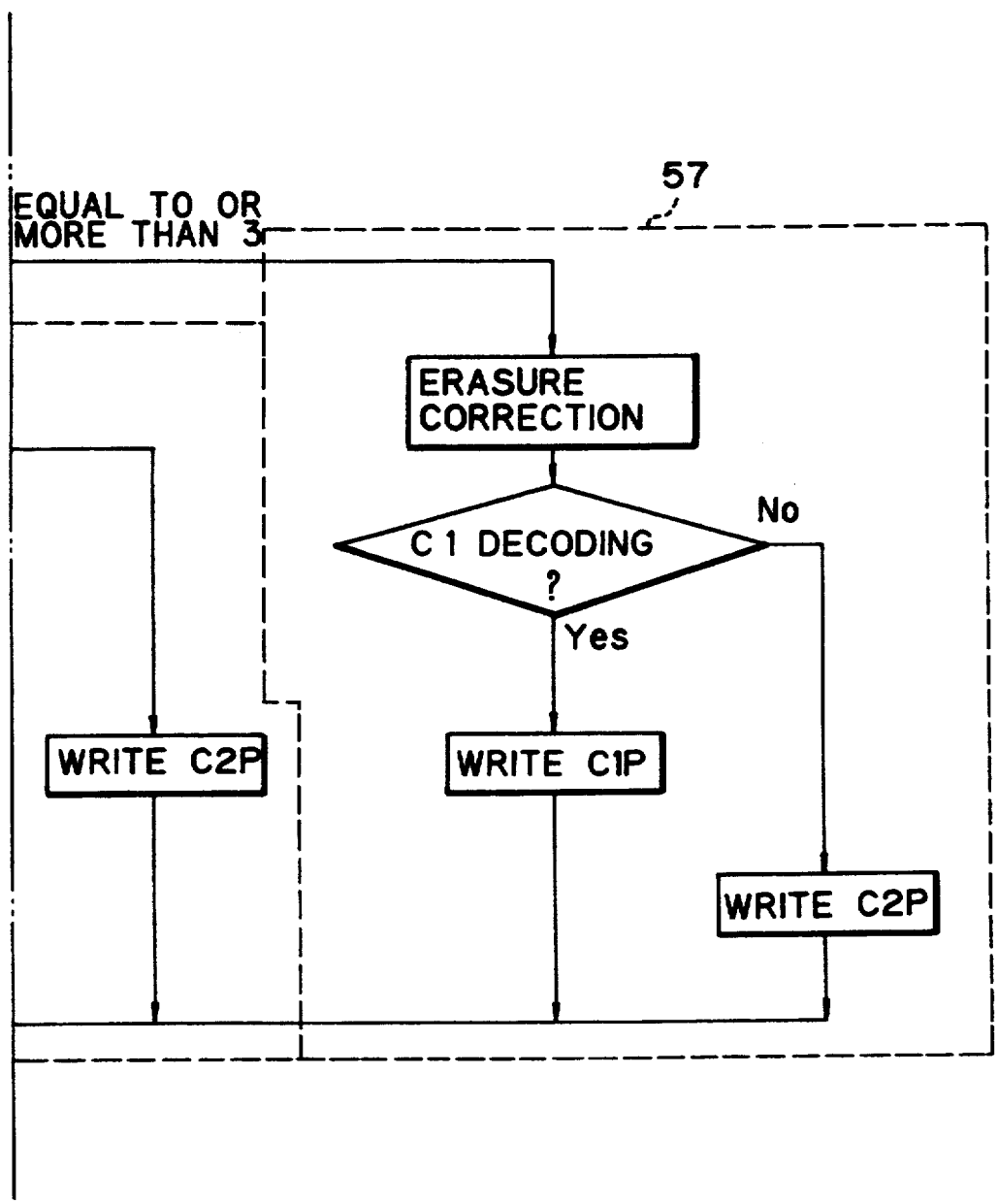

The decoding operation is sequentially performed and is illustrated in the flow chart of FIGS. 7A-7C. As a first step, the C1 pointer of NG, for example, (91)H is set into the pointer area of the buffer RAM 40, the use of H refers to the hexadecimal notation, then the first C1 decoding is performed as follows.

The NG pointer is rewritten into the C1 pointer (C1P) (00)H developed in the absence of an error at pointer generation circuit 37 or into the C1 pointer (FF)H in the presence of an error. The C1 pointer is read out of the pointer area of the buffer RAM, and a constant needed for erasure correction is calculated. See step 51 in FIG. 7B.

The first C2 decoding is performed as follows. Correction of double errors is performed at steps 52 and 53 of FIG. 7B, the C2 pointer C2P is developed at steps 54, 55, 56, and 57 for C2 decoding depending on the correction operation as shown below, and the C2 pointer C2P is written into the pointer area of buffer RAM 40. The following listing shows the various values for the first C2 decoding.

No error: C2P=(00)H
Correction of one error: C2P=(04)H
Correction of two errors: C2P=(08)H
Correction of three erasure: C2P=(0C)H Correction of four erasure: C2P=(10)H
Correction of five erasure: C2P=(14)H
Correction of two erasure and correction of one error: C2P=(2C)H
Correction of three erasure: and correction of one error: C2P=(30)H
Correction is impossible: C2P=(1D)H
Detection of error correction: C2P=(1F)H The second C1 decoding is performed as follows. Correction of double errors is carried out at steps 52 and 53 of FIG. 7B, the C1 pointer C1P is developed at steps 54, 55, 56, and 57 for C1 decoding depending on the correction operation as shown below, and the C1 pointer C1P is written into the pointer area of buffer RAM 40. The following listing shows the code values for the second C1 decoding.

No error: In the case of C1P=(91)H, C1P=(81)H is established. In the case of C1P≠(91)H, C1P=(80)H is established.
Correction of one error: In the case of C1P=(91)H, C1P=(85)H is established. In the case of C1P≠(91)H, C1P=(84)H is established.
Correction of two errors: C1P=(89)H
Correction of three erasure: C1P=(8D)H
Correction of two erasure and correction of one error C1P=(AD)H
Correction is impossible C1P=(91)H
Detection of error correction: C1P=(93)H The second C2 decoding is performed as follows. Correction of double errors is carried out at steps 52 and 53 of FIG. 7B, the C2 pointer C2P is developed at steps 54, 55, 56, and 57 for C2 decoding depending on the correction operation as shown below, and the C2 pointer C2P is written into the pointer area of the buffer RAM 40. The following listing shows the code values for the second C2 decoding.

NO error: C2P=(40)H,
Correction of one error: C2P=(44)H
Correction of two errors: C2P=(48)H
Correction of three erasure: C2P=(4C)H
Correction of four erasure: C2P=(50)H
Correction of five erasure: C2P=(54)H
Correction of six erasure: C2P=(58)H
Correction of two erasure and correction of one error: C2P=(6C)H
Correction 0f three erasure: and correction of one error: C2P=(70)H
Correction of four erasure and correction of one error: C2P=(74)H
Correction is impossible: C2P=(59)H
Detection of error correction: C2P=(5B)H The C1 pointer C1P and the C2 pointer C2P are output to interpolating circuit 42 of FIG. 5 with the decoded data, and an interpolating operation is performed based on such pointer information.

Each of the least significant bits of the C1 pointer and the C2 pointer has information indicative of the presence or absence of an error. A least significant bit of "1" means an error, while a least significant bit of "0" means the absence of an error. The use of an eight-bit code for the C1 pointer and the C2 pointer permits the checking of the tape running system, for example, so as to enable the state of an error and the state of correction processing to be monitored by upper bits of the pointer.

In this embodiment, the NG pointer indication that data is not updated is set beforehand in the pointer area allotted for the C1 pointer of buffer RAM 40 before the first C1 decoding is executed, and the C1 pointer is rewritten depending on the result of the first C1 decoding. Therefore, it can be detected that the data is not updated by reading out the C1 pointer after the first C2 decoding.

If old data is left partially or completely without the updating in buffer RAM 40, an erroneous correction operation is performed, so that an abnormal sound may be generated. Nevertheless, because in this embodiment it can be detected with certainty that the data of buffer RAM 40 is not updated, the possibility of erroneous correction can be lessened. Also, as compared with a method for destroying the contents of the buffer RAM with a random series, for example, an M series after reading out decoded data from the buffer RAM, there are the advantages that the method of this embodiment does not need a random series generating circuit, that the data stored in the buffer RAM can be identified from the beginning of decoding as one that is not updated, and the possibility of erroneous correction can be lowered.

As described above, in a product code error correction capability increases with an increased number of performances of the C1 decoding and C2 decoding. For example, as represented in FIG. 8, cross-points of the series of C1 codes, which can correct a two-symbol error, and the series of C2 codes, which can correct a two-symbol error, form information symbols. An error pattern of error symbols of sixteen cross-points, represented by o and ● is shown in FIG. 8. In a conventional error correction system for sequentially performing the C1 decoding and the C2 decoding, seven error symbols indicated at ● are corrected, while nine error symbols indicated at o remain as they are without being corrected. All error symbols, however, can be corrected by performing the C1 decoding and the C2 decoding once again after the initial C1 decoding and the C2 decoding are completed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, in the above-described embodiment, the invention has been applied to the processing of a reproduced signal of a rotary head digital tape recorder, however, the invention can be applied equally to the decoding of reproduced signals of other recording media, such as an optical disc.

This invention can achieve the increased repetition number of the C1 code decoding and C2 code decoding in the vertical and horizontal directions of a product code so as to improve the error correction capability. The invention also has the advantage that the problem of a power consumption increase will not take place, because the invention differs from a conventional system that has a processor for error correction with an increased operational frequency to raise a processing speed.

What is claimed is:

1. A decoding apparatus in which plural symbols are arranged in a matrix fashion and first and second error correction codes are encoded for each of said plural symbols respectively arranged in a first direction and a second direction for decoding input data transmitted in the first direction, comprising:

memory means having separate memory areas allotted for input data and error pointer data;

means for writing input data into said input data area of said memory means;

error detecting means for detecting an error of the input data written into said memory means based on a decoding of the first error correction code and for generating error pointer data of the first error correction code simultaneously with the writing of the input data into said input data area of said memory means;

means for writing said error data of the first error correction code into said pointer data area of said memory;

address generation means for generating addresses for writing input data and error pointer data in respective memory areas of said memory means;

error correcting means connected to said memory means and receiving input data and error pointer data read out from said memory means for sequentially executing error corrections of the first and second error correction codes to the input data that is written into said memory means by using the error pointer data of the first error correction code that is written into said memory means and the error corrected data and the error pointer data being written back into said memory means in accordance with an error correction circuit address generated by said address generation means; and wherein the input data is reproduced data recorded on a tape by two rotary heads and the first and second error correction codes are decoded for a time period based upon a period of revolution of said rotary heads under control of a timing control unit, so that input data reproduced by one of said rotary heads in a first rotation period is decoded by the first error correction correction code, and in the next rotation period the input data reproduced in the first rotation period is decoded by the second error correction correcting code, the first error correction code and the second error correction code, while input data reproduced in the next rotation period is decoded in parallel by the first error correction code.

2. Decoding apparatus according to claim 1, wherein error correction of the second error correction code is executed using the error data of the first error correction code, and further comprising third memory means for writing the error data of the second error correction code depending on the result of the second error correction.

3. Decoding apparatus according to claim 2, wherein the error data of the first and second error correction codes are set to predetermined data before the execution of the first and second error correction codes is initially performed.

4. Decoding apparatus according to claim 2, wherein the error correction of the first error correction code is executed using the error data of the second error correction code and the error data of the first error correction code is changed depending on the result of the second error correction.

5. Decoding apparatus according to claim 4, wherein the error data of the first and second error correction codes consist of plural bits and predetermined bits of the plural bits indicate the state of the error and the state of the error correction process.

* * * * *

UNITED STATES PATENT AND TRADEMARK OFFICE
CERTIFICATE OF CORRECTION

PATENT NO. : 5,430,741

DATED : July 4, 1995

INVENTOR(S) : Tadashi Fukami

It is certified that error appears in the above-identified patent and that said Letters Patent is hereby corrected as shown below:

```
Col. 2, line 36, change "Figs. 7 and 7A-7C" to --Figs. 7A-7C--
Col. 5, line 13, after "1" insert --,--
Col. 7, line 59, change "(3X6=192)" to --(32X6=192)--
Col. 8, line 17, change ",", second occurrence, to --*--
Col. 9, line 25, after "error" insert --:--
        line 27, after "impossible" insert --:--
        line 37, change "NO" to --No--
        line 46, change "Of" to --of--

Col. 12, line 3, delete "correction" first occurrence
         line 6, delete "correcting"
```

Signed and Sealed this

Twenty-seventh Day of August, 1996

Attest:

BRUCE LEHMAN

*Attesting Officer*  *Commissioner of Patents and Trademarks*